US012401392B2

(12) United States Patent
Cunningham et al.

(10) Patent No.: US 12,401,392 B2
(45) Date of Patent: Aug. 26, 2025

(54) DATA CHANNEL MONITORING AND SELECTION

(71) Applicant: Connectify, Inc., Philadelphia, PA (US)

(72) Inventors: Kevin Cunningham, Swarthmore, PA (US); Harry Volek, Philadelphia, PA (US); Brian Prodoehl, Plymouth Meeting, PA (US); Alexander Gizis, Philadelphia, PA (US)

(73) Assignee: CONNECTIFY, INC., Philadelphia, PA (US)

( * ) Notice: Subject to any disclaimer, the term of this patent is extended or adjusted under 35 U.S.C. 154(b) by 0 days.

(21) Appl. No.: 18/599,886

(22) Filed: Mar. 8, 2024

(65) Prior Publication Data
US 2024/0214027 A1 Jun. 27, 2024

Related U.S. Application Data

(63) Continuation of application No. 18/109,839, filed on Feb. 14, 2023, now Pat. No. 11,956,008, which is a
(Continued)

(51) Int. Cl.
| H04B 1/74 | (2006.01) |
| H04B 17/309 | (2015.01) |
| H04B 17/382 | (2015.01) |
| H04L 1/02 | (2006.01) |
| H04L 1/20 | (2006.01) |
| H04L 43/08 | (2022.01) |

(Continued)

(52) U.S. Cl.
CPC .............. *H04B 1/74* (2013.01); *H04B 17/309* (2015.01); *H04B 17/382* (2015.01); *H04L 1/02* (2013.01); *H04L 1/20* (2013.01); *H04L 43/08* (2013.01); *H04L 43/0823* (2013.01);

*H04L 43/0847* (2013.01); *H04L 43/0852* (2013.01); *H04L 43/0864* (2013.01); *H04L 43/16* (2013.01); *H04L 47/29* (2013.01); *H04L 49/55* (2013.01); *H04L 49/552* (2013.01)

(58) Field of Classification Search
CPC ...... H04B 1/74; H04B 17/309; H04B 17/382; H04L 1/02; H04L 1/20; H04L 43/08; H04L 43/0823; H04L 43/0847; H04L 43/0852; H04L 43/0864; H04L 43/16; H04L 47/29; H04L 49/55; H04L 49/552; H04L 2001/0096; H04L 67/1095; H04L 67/1097
See application file for complete search history.

(56) References Cited

U.S. PATENT DOCUMENTS 5,909,443 A * 6/1999 Fichou ............... H04Q 11/0478
370/414
7,106,760 B1 9/2006 Perumal et al.
(Continued)

Primary Examiner — Dung B Huynh
(74) Attorney, Agent, or Firm — Kamran Emdadi

(57) ABSTRACT

One example may include transmitting data between a client device and a server over a first channel, identifying a transmission rate of the first channel, transmitting additional data between the client device and the server over a second channel, determining whether a transmission rate of the second channel is above or below a transmission rate threshold associated with the first channel, and bonding the first channel with the second channel based on the transmission rate of the second channel being above the transmission rate threshold.

20 Claims, 10 Drawing Sheets

Related U.S. Application Data continuation of application No. 17/458,534, filed on Aug. 26, 2021, now Pat. No. 11,606,118.

(60) Provisional application No. 63/070,874, filed on Aug. 27, 2020.

(51) Int. Cl.
| | |
|---|---|
| *H04L 43/0823* | (2022.01) |
| *H04L 43/0852* | (2022.01) |
| *H04L 43/0864* | (2022.01) |
| *H04L 43/16* | (2022.01) |
| *H04L 47/10* | (2022.01) |
| *H04L 49/55* | (2022.01) |
| *H04L 49/552* | (2022.01) |

(56) References Cited

U.S. PATENT DOCUMENTS

| | | | |
|---|---|---|---|
| 8,493,988 B2* | 7/2013 | Wong | H04L 49/352 370/422 |
| 8,548,034 B2 | 10/2013 | Ling et al. | |
| 8,948,032 B1 | 2/2015 | Sampath | |
| 9,019,973 B1 | 4/2015 | Shukla et al. | |
| 9,160,673 B1* | 10/2015 | Lang | H04L 47/6225 |
| 9,265,055 B2* | 2/2016 | Okuda | H04W 72/542 |
| 9,439,093 B2 | 9/2016 | Chetlur et al. | |
| 9,762,495 B1* | 9/2017 | Chen | H04L 45/22 |
| 9,900,406 B1* | 2/2018 | Hanks | H04L 5/0085 |
| 10,064,100 B2 | 8/2018 | Schoppmeier | |
| 10,120,662 B1* | 11/2018 | Furman | G06F 8/73 |
| 10,277,699 B1 | 4/2019 | Ali et al. | |
| 10,349,435 B2 | 7/2019 | Seo et al. | |
| 10,530,517 B2 | 1/2020 | Yuan et al. | |
| 10,784,999 B2 | 9/2020 | Liu et al. | |
| 10,939,476 B1 | 3/2021 | Chu et al. | |
| 11,115,839 B1* | 9/2021 | Marupaduga | H04W 24/02 |
| 11,818,799 B1* | 11/2023 | Chu | H04W 80/02 |
| 11,956,008 B2* | 4/2024 | Cunningham | H04B 17/309 |
| 2003/0028890 A1* | 2/2003 | Swart | H04N 21/4755 348/E7.071 |
| 2003/0035388 A1 | 2/2003 | Schmidt | |
| 2003/0236902 A1* | 12/2003 | Weiss | H04L 47/722 709/231 |
| 2004/0062198 A1 | 4/2004 | Pedersen et al. | |
| 2005/0041587 A1 | 2/2005 | Lee | |
| 2006/0153093 A1* | 7/2006 | Cloonan | H04L 12/2801 370/252 |
| 2007/0133588 A1 | 6/2007 | Kwon et al. | |
| 2008/0069006 A1* | 3/2008 | Walter | H04L 43/0894 370/465 |
| 2008/0273548 A1 | 11/2008 | Leano et al. | |
| 2008/0300889 A1* | 12/2008 | Dawson | H04L 41/0803 705/1.1 |
| 2009/0067403 A1* | 3/2009 | Chan | H04W 16/10 370/310 |
| 2009/0180478 A1 | 7/2009 | Yu et al. | |
| 2009/0182871 A1 | 7/2009 | Gupta et al. | |
| 2009/0225777 A1* | 9/2009 | Dong | H04L 47/825 370/468 |
| 2009/0313311 A1 | 12/2009 | Hoffmann et al. | |
| 2010/0011230 A1 | 1/2010 | Mater | |
| 2010/0158036 A1 | 6/2010 | Choi et al. | |
| 2010/0202382 A1 | 8/2010 | Park et al. | |
| 2010/0238693 A1 | 9/2010 | Jeddeloh | |
| 2010/0254409 A1* | 10/2010 | Lu | H04L 45/245 370/477 |
| 2011/0044169 A1 | 2/2011 | Liu | |
| 2011/0085647 A1* | 4/2011 | Hicks, III | H04M 11/06 375/259 |
| 2011/0110237 A1* | 5/2011 | Wong | H04L 49/30 370/235 |
| 2011/0116444 A1* | 5/2011 | Relyea | H04W 72/0453 370/328 |
| 2011/0124333 A1* | 5/2011 | Lotze | H04W 16/14 455/434 |
| 2011/0154425 A1 | 6/2011 | Kim et al. | |
| 2011/0211518 A1 | 9/2011 | Gupta et al. | |
| 2011/0292812 A1* | 12/2011 | Kim | H04W 52/34 370/242 |
| 2011/0299538 A1 | 12/2011 | Maruta | |
| 2011/0310738 A1* | 12/2011 | Lee | H04W 28/0257 370/235 |
| 2012/0039173 A1 | 2/2012 | Danzig et al. | |
| 2012/0128045 A1 | 5/2012 | Ling et al. | |
| 2012/0263117 A1* | 10/2012 | Love | H04W 72/23 370/328 |
| 2013/0003800 A1 | 1/2013 | Finkelstein et al. | |
| 2013/0039658 A1 | 2/2013 | Abbas et al. | |
| 2013/0044621 A1* | 2/2013 | Jung | H04J 11/005 370/336 |
| 2013/0120159 A1 | 5/2013 | Stählin et al. | |
| 2013/0182705 A1 | 7/2013 | Avni et al. | |
| 2013/0223418 A1 | 8/2013 | Schmidt | |
| 2013/0235883 A1 | 9/2013 | Hou et al. | |
| 2013/0279507 A1 | 10/2013 | Miyabe | |
| 2014/0006822 A1 | 1/2014 | Diab et al. | |
| 2014/0030979 A1* | 1/2014 | Bowman | H04B 15/00 455/39 |
| 2014/0086081 A1 | 3/2014 | Mack et al. | |
| 2014/0154973 A1* | 6/2014 | Schoppmeier | H04W 28/085 455/39 |
| 2014/0161096 A1 | 6/2014 | Tohzaka et al. | |
| 2014/0178073 A1 | 6/2014 | Katagiri | |
| 2014/0192710 A1* | 7/2014 | Charette | H04W 40/02 370/328 |
| 2014/0219284 A1 | 8/2014 | Chau et al. | |
| 2014/0226665 A1 | 8/2014 | Ido | |
| 2014/0344443 A1* | 11/2014 | Macinnis | H04L 65/65 709/224 |
| 2015/0029862 A1 | 1/2015 | Olenz et al. | |
| 2015/0055608 A1* | 2/2015 | Egner | H04W 4/025 370/329 |
| 2015/0078256 A1* | 3/2015 | Van Wyk | H04L 47/365 370/328 |
| 2015/0173009 A1* | 6/2015 | Vallath | H04W 48/18 370/329 |
| 2015/0208341 A1 | 7/2015 | Mohamed et al. | |
| 2015/0223098 A1* | 8/2015 | Sze | H04L 43/0852 370/235 |
| 2015/0237491 A1 | 8/2015 | Selén et al. | |
| 2015/0281871 A1* | 10/2015 | Poulsen | G06F 13/4027 370/328 |
| 2015/0288599 A1 | 10/2015 | Zhou et al. | |
| 2015/0311923 A1 | 10/2015 | Valliappan et al. | |
| 2015/0372929 A1 | 12/2015 | Rochwerger et al. | |
| 2016/0062623 A1 | 3/2016 | Howard et al. | |
| 2016/0112495 A1* | 4/2016 | Gizis | H04L 67/52 709/219 |
| 2016/0142343 A1 | 5/2016 | Tongle et al. | |
| 2016/0164781 A1 | 6/2016 | Imai et al. | |
| 2016/0212755 A1* | 7/2016 | Cao | H04L 45/245 |
| 2016/0219589 A1 | 7/2016 | Khawer et al. | |
| 2016/0323878 A1 | 11/2016 | Ghosh et al. | |
| 2016/0329986 A1 | 11/2016 | Eitan | |
| 2017/0013507 A1 | 1/2017 | Lee et al. | |
| 2017/0026128 A1 | 1/2017 | Remein et al. | |
| 2017/0026970 A1 | 1/2017 | Pack et al. | |
| 2017/0055179 A1 | 2/2017 | Radunovic et al. | |
| 2017/0135070 A1 | 5/2017 | Huber et al. | |
| 2017/0280435 A1 | 9/2017 | Egner et al. | |
| 2017/0367099 A1 | 12/2017 | Cariou et al. | |
| 2018/0014226 A1 | 1/2018 | Li et al. | |
| 2018/0027468 A1* | 1/2018 | Pasulka | H04W 36/22 370/235 |
| 2018/0027506 A1 | 1/2018 | Pasulka et al. | |
| 2018/0077748 A1* | 3/2018 | Kazmi | H04W 76/14 |
| 2018/0098238 A1* | 4/2018 | Saxena | H04W 36/0066 |
| 2018/0103425 A1 | 4/2018 | Arora et al. | |
| 2018/0198732 A1 | 7/2018 | Karthikeyan et al. | |
| 2018/0234884 A1* | 8/2018 | Nakagawa | H04W 24/08 |
| 2018/0235005 A1* | 8/2018 | Ansari | H04L 27/0006 |

(56) References Cited

U.S. PATENT DOCUMENTS

| | | |
|---|---|---|
| 2018/0324763 A1* | 11/2018 | Huber .................. H04W 72/04 |
| 2018/0351721 A1 | 12/2018 | Li et al. |
| 2018/0367650 A1 | 12/2018 | Motozuka et al. |
| 2019/0046876 A1 | 2/2019 | Dietrich et al. |
| 2019/0081900 A1 | 3/2019 | Peleska et al. |
| 2019/0098601 A1* | 3/2019 | Kumar ................ H04W 72/563 |
| 2019/0103952 A1 | 4/2019 | Goudal et al. |
| 2019/0104460 A1 | 4/2019 | Poorrezaei et al. |
| 2019/0190835 A1* | 6/2019 | Sung ....................... H04L 43/08 |
| 2019/0191414 A1 | 6/2019 | Bang et al. |
| 2019/0229796 A1 | 7/2019 | Wee et al. |
| 2019/0297674 A1 | 9/2019 | Min et al. |
| 2019/0327679 A1 | 10/2019 | Gupta et al. |
| 2020/0007265 A1* | 1/2020 | Min ..................... H04L 1/0003 |
| 2020/0052926 A1 | 2/2020 | Sung et al. |
| 2020/0053829 A1 | 2/2020 | Morioka |
| 2020/0059929 A1 | 2/2020 | Jones |
| 2020/0076718 A1* | 3/2020 | Khan ..................... H04L 63/08 |
| 2020/0119976 A1 | 4/2020 | Xu et al. |
| 2020/0128482 A1 | 4/2020 | Daoura et al. |
| 2020/0145325 A1* | 5/2020 | LaVigne ............. H04L 49/253 |
| 2020/0145342 A1 | 5/2020 | Olesen et al. |
| 2020/0177311 A1 | 6/2020 | Ho et al. |
| 2020/0196182 A1 | 6/2020 | Nam et al. |
| 2020/0204235 A1* | 6/2020 | Liu ......................... H04B 7/06 |
| 2020/0213360 A1* | 7/2020 | Ojha ..................... H04W 12/69 |
| 2020/0259738 A1* | 8/2020 | Wang ..................... H04L 69/14 |
| 2020/0313970 A1* | 10/2020 | Almasmoum ...... H04L 41/0806 |
| 2020/0322096 A1 | 10/2020 | Sung et al. |
| 2020/0329470 A1* | 10/2020 | Liu ..................... H04L 12/2801 |
| 2021/0019276 A1 | 1/2021 | Meiri et al. |
| 2021/0037409 A1* | 2/2021 | Thorsén ................ H04L 45/245 |
| 2021/0051653 A1* | 2/2021 | Park ........................ H04W 8/22 |
| 2021/0114616 A1* | 4/2021 | Altman ................ H04W 76/15 |
| 2021/0119725 A1* | 4/2021 | Yang ..................... H04L 1/0008 |
| 2021/0176666 A1 | 6/2021 | Ayadurai et al. |
| 2021/0219110 A1 | 7/2021 | Kousaridas et al. |
| 2021/0234579 A1* | 7/2021 | Han ...................... H04B 7/0689 |
| 2021/0266768 A1* | 8/2021 | Siripurapu ............ H04L 47/122 |
| 2021/0289384 A1* | 9/2021 | Wang ..................... H04W 8/24 |
| 2021/0289388 A1 | 9/2021 | Huang |
| 2021/0351817 A1* | 11/2021 | Cordeiro .............. H04B 7/0413 |
| 2021/0399960 A1* | 12/2021 | Cunningham .......... H04L 43/16 |
| 2022/0030625 A1 | 1/2022 | Yang et al. |
| 2022/0131951 A1 | 4/2022 | Ovadia |
| 2022/0210698 A1 | 6/2022 | Ly et al. |
| 2022/0353123 A1 | 11/2022 | Kim et al. |
| 2023/0180275 A1* | 6/2023 | Feng ..................... H04L 1/0002 370/329 |

\* cited by examiner

DATA CHANNEL MONITORING AND SELECTION

FIELD OF THE INVENTION

The present invention relates to data transfer and more specifically to data transfer between a client device and a server. In particular, a method and apparatus are described for transferring data over one or more channels, and for switching, mirroring, or bonding channels, or a combination of each responsive to one or more thresholds being reached or exceeded.

BACKGROUND OF THE INVENTION

Computers can communicate with one another when connected together using some form of a communications network. The Internet is one such network, which has grown extensively over the past decade, and has the distinct advantage of being able to connect computers together from anywhere in the world. Another type of communications network is a local area networks ("LAN"), which are private networks that typically exist between only a few trusted computers, usually in an office or home. A further example of a computer communications network is a wide area network ("WAN"), which is usually used as a means of communications access to the Internet via a wireless radio protocol.

There are many possible reasons to want remote computers to join a LAN. A LAN itself is often secure, it may contain or have access to important corporate resources at the office, or access to one's personal media or data files in a residential setting. However, once a user attaches to a LAN via a direct Internet connection, the LAN is no longer secure. For this reason, the Virtual Private Network ("VPN") was created. The VPN is software that appears to be another LAN adapter, but uses encryption technology and Internet connections to bridge remote computers onto a local area network, without risk of directly connecting the LAN to the public and insecure Internet.

FIG. 1 illustrates a prior art virtual private network 100. In such a network, predefined or rolling algorithms permit a secure connection between a computer device (client) 102 and a remote server 160. This connection is made over any network 140, which may also be the Internet, with security managed by the VPN layer on the VPN server 150. Any software applications 110 on the client computer 102 will identify the VPN layer as a VPN client 120 agent application which appears no different than the driver for a physical network interface. The VPN client 120 has the ability to encapsulate traffic sent to it (in some cases as encrypted, private data), and then to send the data via a standard network interface and driver 121 to a physical network interface device, such as a Wi-Fi or Ethernet device. From there, the data may travel to Internet 140 via LAN 130 and ISP 135.

A single Internet service provider (ISP) is illustrated for handling both cellular access and a LAN, although this is merely exemplary. For example, respectively different ISPs may be used for cellular access and the LAN.

The VPN data may be secure over the Internet 140, using encryption, and is subsequently sent to VPN server 150. VPN server 150 may decapsulate (e.g., decrypt) the data received from the VPN client (via decapsulate/encapsulate module 122) before sending the decrypted data to remote server 160. Remote server 160 may transmit a response to VPN server 150, which may be encapsulated (encrypted) and sent to computer 102 (wherein that data is decrypted before being provided to the user).

In operation, client 102 runs applications 110 in order to communicate over Internet 140 with multiple servers, including server 160. Server 160 may provide client 102 with streaming content while another server may provide client 102 with non-streaming content, such as the download of a static webpage. Client 102 transmits requests for data from server 160 via optional LAN 130, ISP 135 and Internet 140. Server 160 (and other servers) responds to data requests via Internet 140.

SUMMARY OF THE INVENTION

One example embodiment includes a method of transmitting data between a client and a server, the method may include transmitting data from and receiving data at a VPN client with the client over a first channel, measuring or generating error rate on the first channel or a second channel not mirrored with the first channel, if the error rate crosses a first threshold and a data value associated with the second channel is less than or equal to a data value threshold, then mirroring the first channel and the second channel, if the error rate is between the first threshold and a second threshold, and the data value is greater than the data value threshold, then prevent mirroring the first channel and the second channel, if the error rate crosses the second threshold and is not between the first threshold and the second threshold then mirroring the first channel and the second channel.

One example embodiment may include a process which may include transmitting data between a client device and a server over a first channel, determining an error rate on at least one of the first channel and a second channel not mirrored with the first channel, when the error rate crosses a first error rate threshold then mirroring the first channel and the second channel, and when the error rate is between the first error rate threshold and a second error rate threshold that is different than the first error rate threshold, determining whether to continue mirroring or discontinue the mirroring of the first channel and the second channel.

Another example embodiment may include a system that includes a client device transmitting data to a server over a first channel, and the client device is configured to determine an error rate on at least one of the first channel and a second channel not mirrored with the first channel, when the error rate crosses a first error rate threshold then mirror the first channel and the second channel, and when the error rate is between the first error rate threshold and a second error rate threshold that is different than the first error rate threshold, determine whether to continue mirroring or discontinue the mirroring of the first channel and the second channel.

Another example embodiment may include a non-transitory computer readable storage medium configured to store instructions that when executed cause a processor to perform transmitting data between a client device and a server over a first channel determining an error rate on at least one of the first channel and a second channel not mirrored with the first channel, when the error rate crosses a first error rate threshold then mirroring the first channel and the second channel, and when the error rate is between the first error rate threshold and a second error rate threshold that is different than the first error rate threshold, determining whether to continue mirroring or discontinue the mirroring of the first channel and the second channel.

Another example embodiment may include transmitting data between a client device and a server over a first channel, sending test data on a second channel to identify a transmission rate of the second channel, comparing the transmission rate to a transmission rate threshold, and determining whether to perform bonding of the first channel with the second channel based on the transmission rate of the second channel being greater or less than the transmission rate threshold.

Still another example embodiment may include transmitting data between a client device and a server over a first channel, identifying a transmission rate of the first channel, transmitting additional data between the client device and the server over a second channel, determining whether a transmission rate of the second channel is above or below a transmission rate threshold associated with the first channel, and bonding the first channel with the second channel based on the transmission rate of the second channel being above the transmission rate threshold.

DETAILED DESCRIPTION

Figure 1:
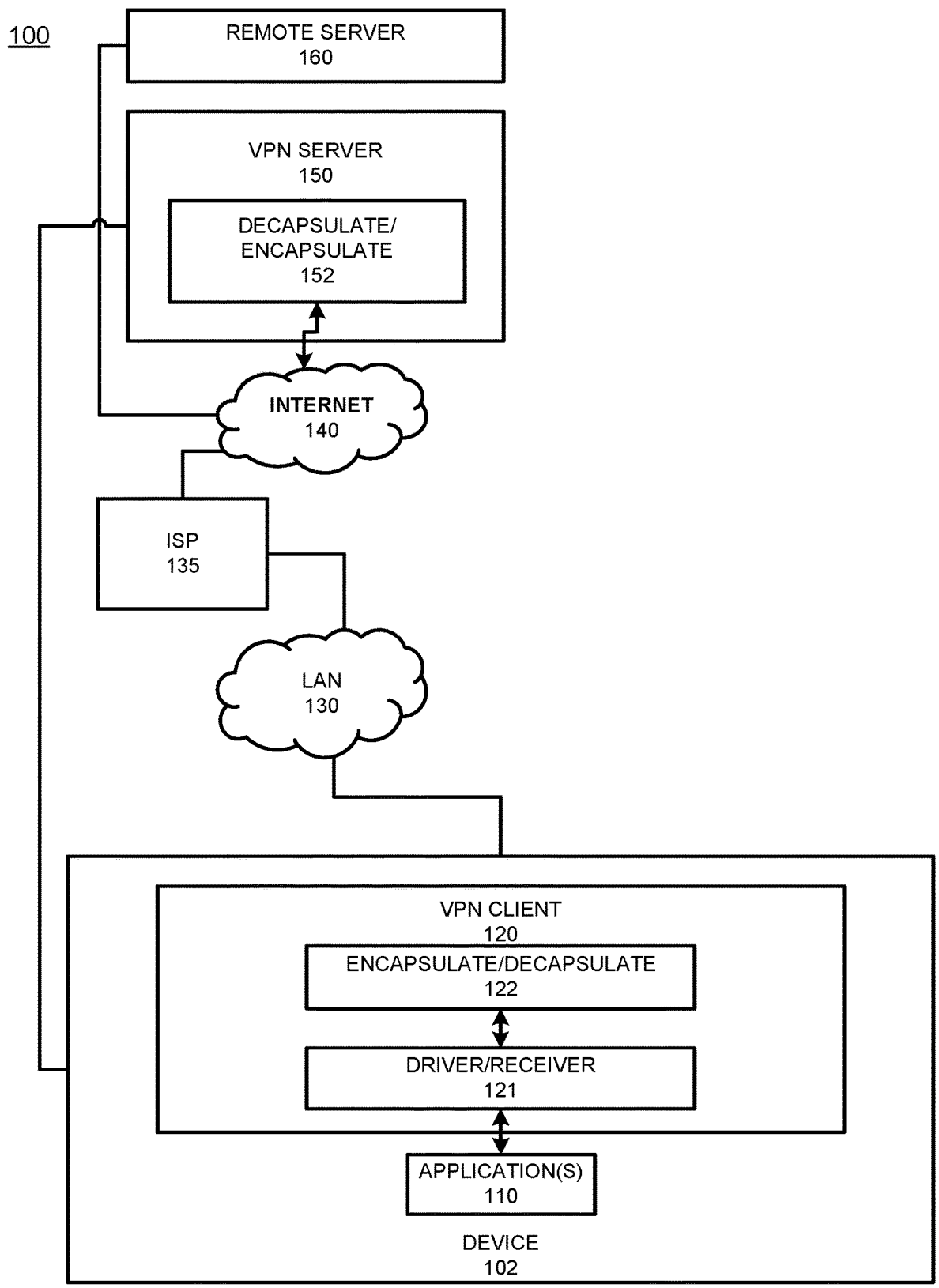
FIG. 1 is a block diagram of a communication system that communicates with a VPN server in accordance with the prior art.
Figure 2:
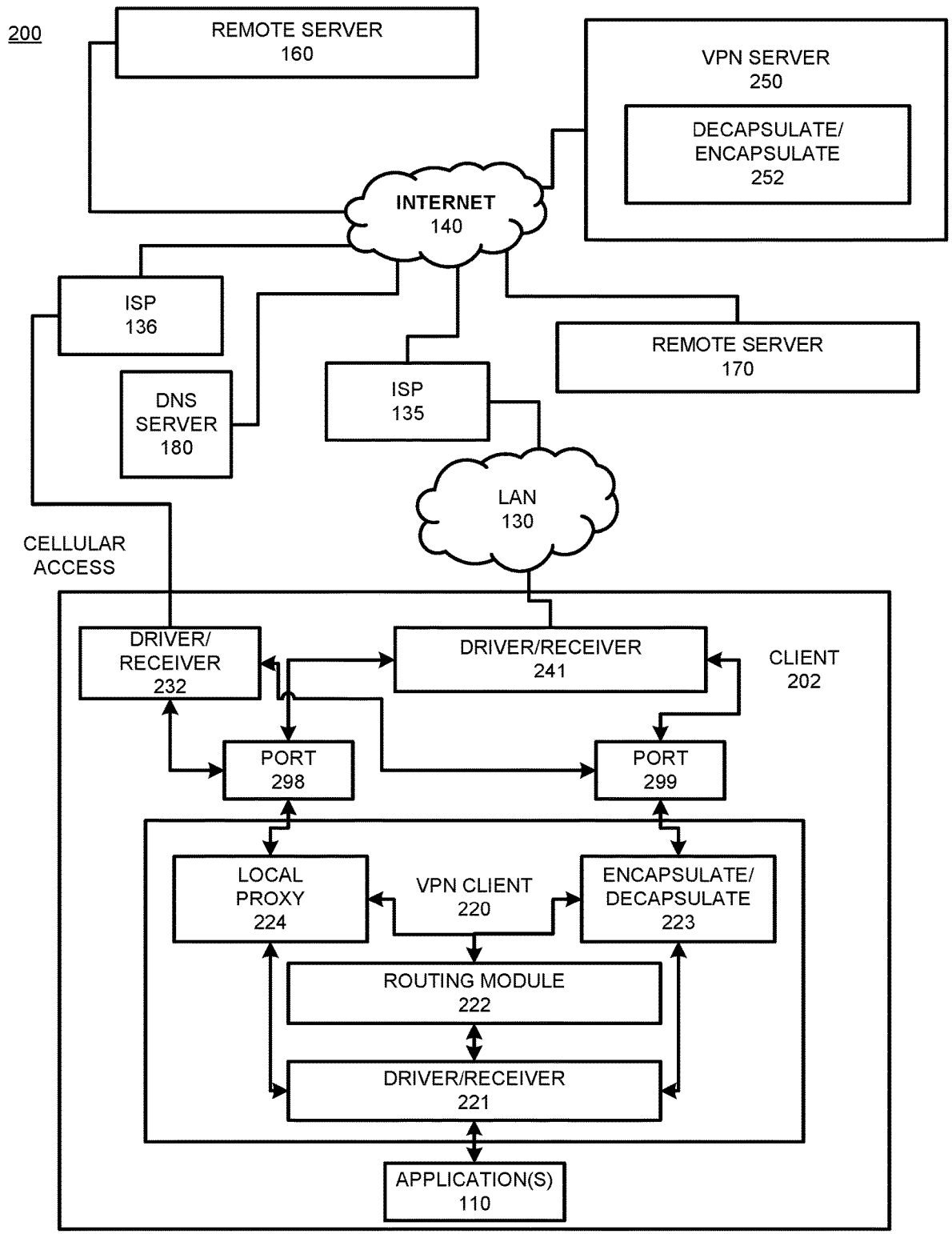
FIG. 2 is a block diagram of a communication system that communicates with a VPN server used in accordance with exemplary embodiments of the present invention.

FIG. 2 is a block diagram that illustrates communication system 200 in accordance with one or more exemplary embodiments of the present invention.

Generally speaking, communication system 200 includes client device 202 (client) and remote server 160. Client 202 may be, for example, a mobile communications device. Remote server 160 may be a source of data that is desired by client 202. Remote server 160 may be a source of data, a destination and/or a combination of both, such as when a VoIP call is being conducted between the client 202 and the server 160. In one or more exemplary embodiments of the present invention, remote server 160 is a source of video streaming. Streaming data services may also be used in accordance with the VPN server 250. Other examples of streaming data services may be voice calls, video calls or other data services which perform real-time data communications. Thus, in one example, client 202 desires to receive video content from a video streaming provider.

Communication system 200 further includes a virtual private network (VPN) server 250. In addition to client 202 communicating with remote server 160, client 202 may also attempt to communicate with a source of data via the VPN 250. The VPN, for example, provides data encapsulation (which may or may not include data encryption). One exemplary use of a VPN is to provide secure, encrypted data. Thus, client 202 may communicate with remote server 160 as well as communicate over the VPN.

The above objective, to communicate with remote server 160 as well as to communicate over the VPN, may take several forms. In one form, communication with remote server 160 is outside of the VPN, while further communication takes place with the VPN. The communication that takes place with the VPN may be with remote server 160 or with another remote server 170. In another example, communication with remote server 160 may be over a VPN while additional communication occurs with a VPN (the same VPN that is communicating with remote server 160 or different VPN). In the explanation set forth below, communication with remote server 160 is outside of a VPN while communication to remote server 160 or to additional remote server 170 occurs with a VPN, but this is merely an example and other possibilities are available.

FIG. 2 illustrates client 202 communicating with the network via a VPN client 220. Initially, FIG. 2 illustrates that client 202 wishes to communicate with remote server 160. As shown, client 202 may be, for example, a mobile communications device that wirelessly communicates with network 135 via one or more access points (that may include ethernet, modem, cellular, Wi-Fi, etc.). ISP 135 and ISP 136 may each permit public access or restricted access. As an example, ISP 135 may include a communications network that is typically accessed over a wired connection, while ISP 136 may include a communications network that is accessed by a cellular communications provider. Alternatively, or in addition, an ISP may be provided that permits both forms of communication and perhaps another form of communication. ISP 135 and ISP 136 are shown coupled to Internet 140 through communication protocols that are well known to one of ordinary skill in the art. In one example, ISP 135 and ISP 136 interface with Internet 140 via a fiber-optic or ethernet Internet connection.

While in one example ISP 136 is accessed by a cellular access point having a dedicated driver/receiver 232, ISP 136 may be accessed via other methods alternatively or as well, such as a LAN (e.g. a wireless home network), a combination of wired and/or wireless connections, and perhaps one or more intervening networks (such as a wide area network) so that access to Internet 140 may be obtained.

In the example above, client 202 may be used for voice communication. Assume client 202 is a cell phone such as a smartphone, and communication occurs via a Voice over IP (VoIP) application. Client 110 communicates with ISP 135, ISP 136, or both (alternatively or simultaneously using technology such as channel bonding) via one or more access points and a digitized form of the user's voice is then transmitted to Internet 140. From Internet 140, the data that represents the user's voice is transmitted to remote server 170. From remote server 170, the data may be transmitted to another user (not shown) so that voice communication between the two users may occur.

In another embodiment, a user may use client 202 for secure voice communication while using VoIP. Data from application 110 enters VPN client 220 via driver/receiver 221. Optional routing module 222 may optionally route data to either optional local proxy 224 or encap/decap module 223. Voice communication data is encapsulated (which may or may not include encryption) via encapsulate/decapsulate (encap/decap) module 223. Data from local proxy 224 is forwarded to driver/receiver 241 via port 299. Data from encap/decap module 223 is forwarded to driver/receiver 241 via port 298. Encapsulated data is then transmitted to ISP 135 (and/or ISP 136) via one or more access points before reaching Internet 140. From Internet 140, the encapsulated data (i.e., the encapsulated voice communication data) is transmitted to VPN server 250. Data is then decapsulated (which may or may not include decryption) via decapsulate/encapsulate (decap/encap) module 252 before being retransmitted to Internet 140 and remote server 170. From remote server 170, the data may be transmitted to another user device (not shown) so that voice communication between two users may occur via a VPN.

In another embodiment, client 202 streams video data from remote server 160. Client 202 requests the video data from remote server 160 by transmitting a request through ISP 135 (and/or ISP 136) and Internet 140. Remote server 160 responds to the request by transmitting video via Internet 140, and back to ISP 135 (and/or ISP 136), so that it is eventually received by client 202. Such video streaming occurs outside of the VPN. The request to stream data may or may not be preceded by a DNS request processed by DNS server 180 to provide the IP address of remote server 160

In yet another example, remote server 160 serves two purposes: first, it is used as the source of streaming data (inside or outside a VPN) and second, it is used in combination with data that has been transmitted via the VPN.

In another example, data is transmitted via a VPN, and further data is transmitted outside of the VPN (or outside of the VPN on another VPN). The data may be transmitted to at least two different servers (a remote server and a VPN server). Alternatively, the data transmitted via the VPN and outside of the VPN (or outside on another VPN) may be transmitted to the same server.

In the above description, when the phrase "outside of the VPN" is used, this may include non-encapsulated/unencrypted data (i.e., data not encapsulated/encrypted by a VPN) and/or encapsulated/encrypted data that has been encapsulated/encrypted by another VPN.

In an ideal situation, if error rates are at undesirable levels, or if user experience would be improved by a faster data transmission rate, then either a) a first channel would be replaced with a second channel (with lower error rate or faster speed); or b) a first channel and a second channel would be used together. For example, if two channels are mirrored, the effective error rate will typically go down since the same data is transmitted and received over two separate channels. As a further example, if two channels are bonded, bandwidth (speed) will typically go up. With bonding, different data or a common set of data is sent over two channels to optimize bandwidth provided by two or more channels (e.g., a Wi-Fi channel bonded with a cellular channel).

While in theory the use of a second channel is desirable because it may reduce error rate or increase transmission speed, the use of a second channel is not always practical because it increases a total amount of utilized resources, such a power in addition to available bandwidth. Users often engage in Internet communication over their home Wi-Fi systems or over "limited" or "unlimited" cellular data plans. In such situations, a fixed monthly fee may provide users with access to large amounts of data. When the application attempts to use a second channel in combination with a first channel or in place of the first channel, additional resources may be incurred. A typical example of such a situation is cellular "roaming." If the second channel is a "roaming" channel, the value of such a channel per minute or per gigabyte (BG) may be greater and may reduce efficiency and utilize more power on a power limited device, such as a mobile device.

In some situations, having access to a second channel may be critical, and without that second channel, data transfer may not be possible. But in other situations, the benefit obtained by the second channel may be marginal, and because the user experience is affected to an insignificant level, the improvements obtained may be so negligible that they are not worth the modification. A user may not be interested, for example, in improving bandwidth by a small margin, such as 5% if total resources utilized are increased by an undesirable amount. Also, different applications may be used differently with respect to the channels, the number of channels and whether the channels are bonded or mirrored or used one at a time until both are necessary to achieve a particular level of quality and redundancy over a period of time.

Accordingly, enabling a second channel or additional channels to be used in situations where an error rate or bandwidth modifications may be desirable especially when such changes do not create a lack of efficiency in the overall system configuration. Thus, if the use of the second channel does not create an inefficient use or resources, then the second channel is made available. However, if using the second channel is not an optimal strategy then the use of the second channel is deferred until a more optimal solution is identified.

Figure 3A:
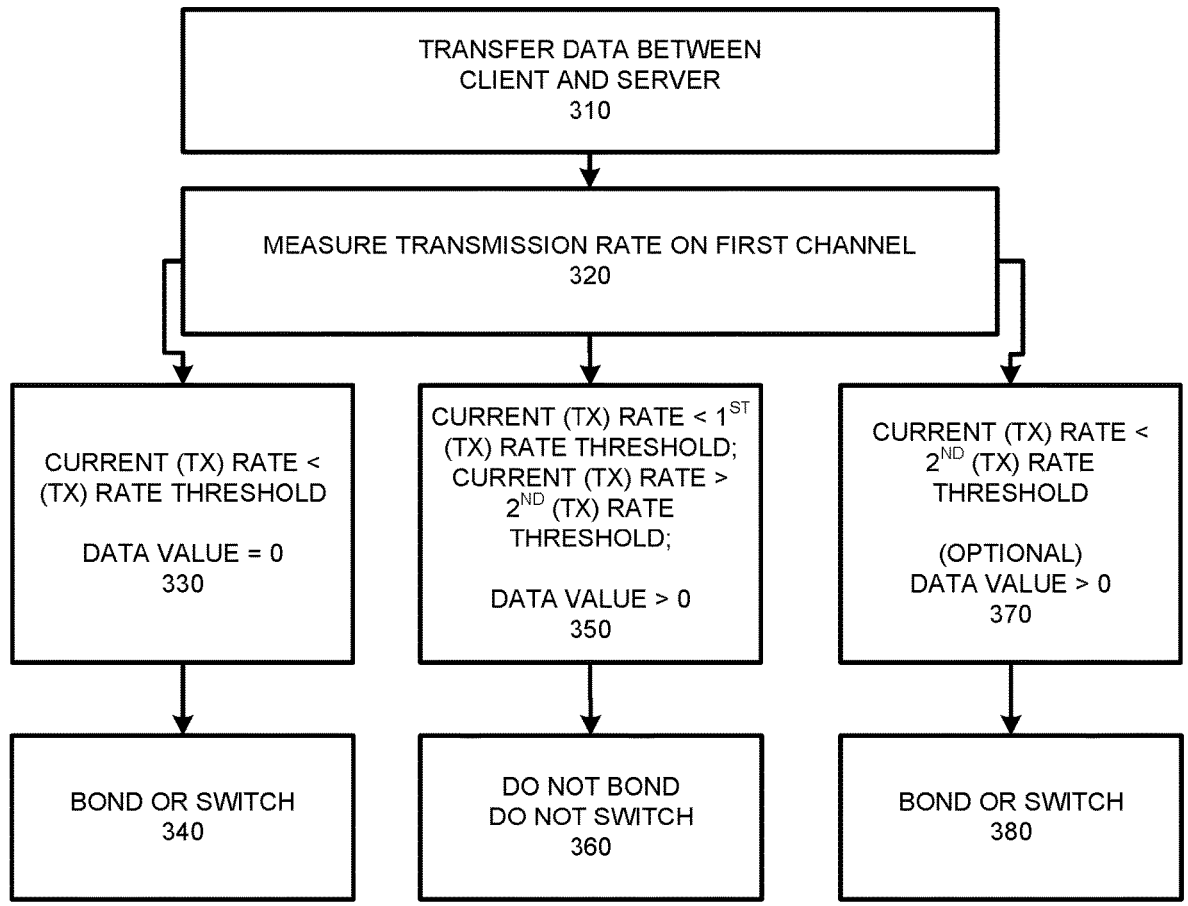
FIGS. 3A and 3B are flowchart diagrams that illustrate operation of one or more exemplary embodiments of the present invention.
Figure 3B:
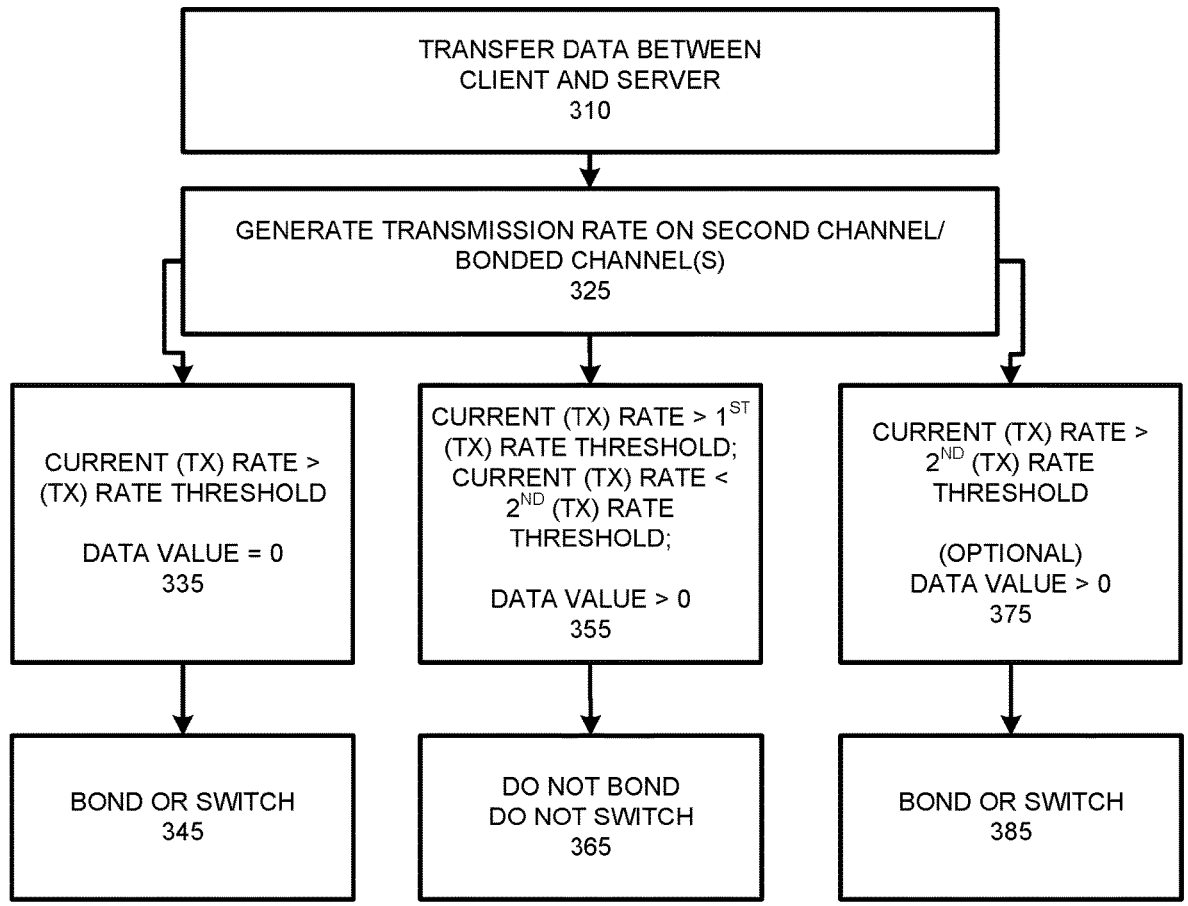
Figure 4A:
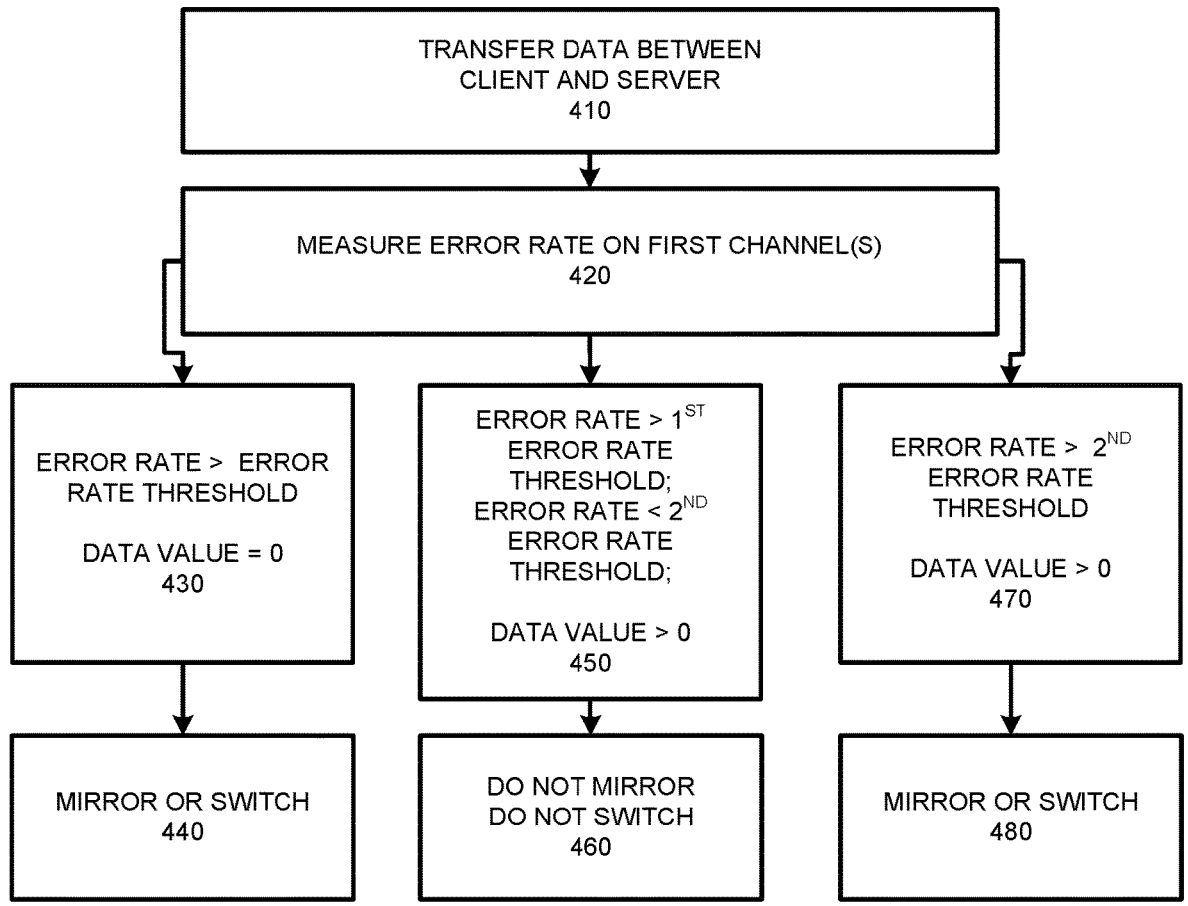
FIGS. 4A and 4B are flowchart diagrams that illustrate operation of one or more exemplary embodiments of the present invention.
Figure 4B:
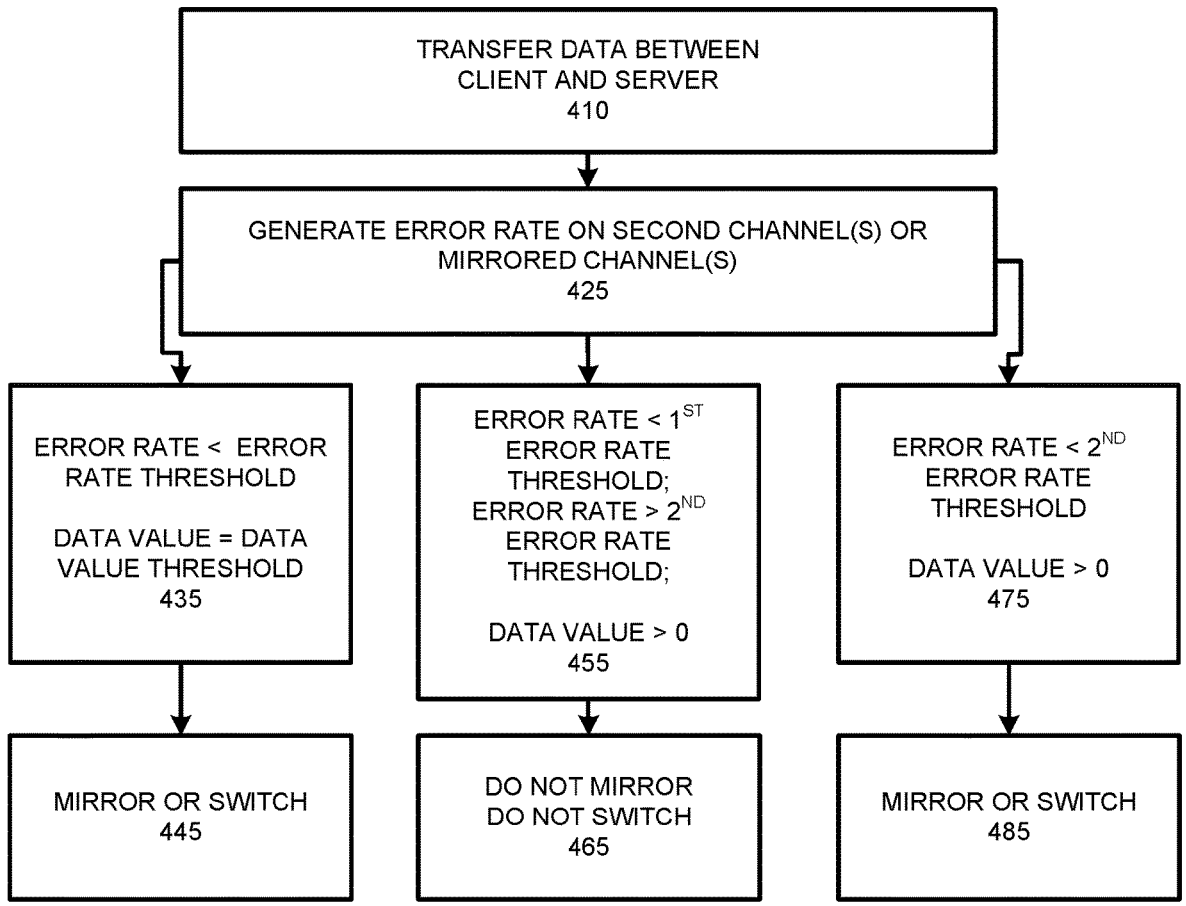

FIGS. 3A, 3B, 4A and 4B are flow charts that illustrate exemplary embodiments of the present invention. FIGS. 3A and 3B illustrate exemplary embodiments with regard to improving data rate (bandwidth). FIGS. 4A and 4B illustrate exemplary embodiments with regard to improving error rate.

In FIG. 3A, a current channel is evaluated to determine whether data is being transferred at an appropriate speed measured by a target speed or threshold data rate as a point of reference. If the speed of data transfer is below the data rate threshold, then either the data transfer is switched to another channel, or the current (first) channel and a second channel are bonded to increase overall bandwidth and throughput of the data. In FIG. 3B, a second channel is evaluated to determine whether use of the second channel would improve a current data transfer speed. If it is determined that fast(er) speed would be obtained by switching to the second channel, or by bonding the first channel and the second channel, then either of these operations are carried out. In a further example, the speed on the first channel is compared with the speed on the second channel (or what is obtained bonding the first and second channel) and switching/mirroring to/with the second channel is performed if the higher speed is obtained. Thus, FIG. 3A relates to a situation in which a current channel is evaluated and determined to be insufficient with regard to an amount of bandwidth, and switching/bonding may occur in order to improve the situation. By contrast, FIG. 3B relates to a situation in which a second channel is evaluated (or expected) to provide sufficient bandwidth, and switching/bonding may occur in order to obtain the evaluated (or expected) improvement. Switching/bonding may be performed in accordance with FIG. 3A, FIG. 3B, or a combination thereof (or portions thereof) so that data rates are compared in portions of both examples before switching/bonding occurs.

In FIG. 4A, a current channel is evaluated to determine whether data is being transferred with a sufficiently low error rate (which may possibly be zero). If the error rate is above an error rate threshold, then either a) data transfer is switched to another channel, or b) the current (first) channel and a second channel are mirrored. It is important to note that an error rate of data transferred is measured based on a function of lost packets, not sent packets, etc. (i.e., errors) and latency measured in milliseconds. In FIG. 4B, a second channel is evaluated to determine whether use of the second channel would improve the error rate. If it is determined that low(er) (or zero) error rate would be obtained by switching to the second channel, or mirroring the first channel and the second channel, then either of these operations are carried out. In a further example, the error rates on the first channel and the second channel are compared, and if the error rate achieved by switching/mirroring to/with the second channel is estimated to be lower than the error rate currently identified/achieved on the first channel, then switching to the second channel or mirroring the first and second channels occurs. Thus, FIG. 4A relates to a situation in which a current channel is evaluated and determined to be insufficient with regard to the error rate, and switching/mirroring may occur in order to improve the situation. By contrast, FIG. 4B relates to a situation in which a second channel is evaluated (or expected) to provide a low (or zero) error rate, and switching/mirroring may occur in order to obtain the evaluated (or expected) improvement. Switching/mirroring may be performed in accordance with FIG. 4A, FIG. 4B, or a combination thereof (or portions thereof) so that error rates are compared in portions of both FIGS. 4A and 4b before switching/mirroring occurs.

Returning to FIGS. 3A and 3B, these figures illustrate the operation of one or more exemplary embodiments of the present invention. FIG. 3A relates to determinations that are made whether to bond two channels (or to replace one channel with another channel). For example, if use of the second channel does not increase the data value, then bonding is readily provided (or the first channel is replaced with the second channel). If, however, use of the second channel is increasing the data value measurement, then bonding (or replacement) is deferred until the use of bonding is justified.

At 310, data is transferred between client 202 and server 160. Data is transferred between client 202 and server 160 in a data stream. Initially, the data transfer in the data stream occurs via one channel (or may occur by multiple channels). At 320, the transmission rate on the current (first) channel is measured.

FIG. 3A illustrates that a variety of operations may be performed after 320. While FIG. 3A shows three "flows" extending from 320, this is merely exemplary as fewer or a greater number of flows may be used depending on the strategy employed.

At 330, a current transmission rate is compared with a transmission rate threshold. If the current transmission rate is below a transmission rate threshold, and if a data value associated with a second channel equals a data value threshold (e.g., 0), then the current (first) channel is switched to a second channel or the first and second channel are bonded. In one example, the data value threshold corresponds to a value associated with use of the second channel, and in a further example, the data value threshold equals 0. The desired transmission rate is the transmission rate that would be obtained if the present (first) channel were to be bonded with a second channel. That transmission rate can be obtained, for example, from published data or experimental data. For example, client 202 can transmit test data on the second channel to determine the bandwidth of the second channel. The transmission rate threshold may be, for example, the current rate of transmission using the first channel without using the second channel. As indicated by operation 330, if the transmission rate that would be obtained from bonding is greater than the transmission rate threshold (e.g., the current transmission rate) and if the "data value" equals '0', in this example "data value" is a specific value. The value of this example may be equal to '0'. In this example, the current (first) channel is bonded with a second channel at operation 340.

In a further exemplary embodiment of the present invention, the data value threshold is subject to some variance. For example, in a further exemplary embodiment, the data value threshold may not be equal to 0, but it may be close to 0. For example, the data value threshold may be equal to a value of 10, which is a higher value of resources than '0'. The rationale is that if the second channel does not increase the overall value, then there is no disadvantage in trying to switch or bond with the second channel, but if the technical advantages of switching/bonding are minimal and the value is high, then the overall value requirements outweigh the technical advantages obtained, and switching/bonding may lack an overall benefit. On the other hand, if the second channel value is low, then an overall benefit may be achieved in switching/bonding, because even though the technical advantage achieved may be minimal, and the value involved may also be minimal. On the other hand, if the second channel value is high then switching/bonding to obtain small improvements may not be justified.

Of course, as technical advantages achieved by switching/bonding increases, an increased value may be justified. The relationship between the two options may be related, such as a linear relationship, exponential relationship, or some other relationship. This relationship may be a basis for the data value threshold in operation 330, and as the technical benefit increases, the data value threshold also increases.

Operation 330 as described above includes the operation of bonding (or replacing a channel) if performance of the current channel is below a transmission rate threshold. Alternatively, switching/bonding may be based on performance of a second channel (i.e., switching/bonding yields better performance than not switching/bonding). This is further discussed below with regard to FIG. 3B.

In accordance with FIG. 3A, processing may also proceed from operation 320 to operation 350. At 350, the transmission rate on the current (first) channel is compared with a first transmission rate threshold and a second transmission rate threshold. A data value associated with the current channel is also compared with a data value threshold ('0' in the present example). If the transmission rate is below a first threshold, above a second threshold, but the data value is not equal to zero (or in some embodiments a number close to zero), then switching/bonding does not occur. For example, assume that a data speed on the current channel is desired to be 300 megabits per second (Mbps). Assume that the first threshold is 300 Mbps, the second threshold is 280 Mbps, and the data is transmitting at a current rate of 290 Mbps. In this example, if the data value is not equal to '0' (as an example of the data value threshold), then the advantage of switching/bonding does not justify the increase in value. Therefore, switching/bonding does not occur at operation 360.

In accordance with FIG. 3A, processing may also proceed from 320 to 370. At operation 370, the current transmission rate is compared with the second transmission rate threshold. If the current transmission rate is below the second transmission rate threshold and the data value associated with the second channel is greater than the data value threshold (e.g., value is greater than '0') then switching/ bonding to/with the second channel occurs. In other words, compared with operation 350, because the transmission speed on the current (first) channel is below the second transmission rate threshold, the technical benefits of using the second channel outweigh the disadvantages associated with an added value of the resources. Therefore, at operation 380 switching/bonding occurs.

FIG. 3B is a flow chart diagram that illustrates one or more exemplary embodiments of the present invention. At operation 310, data is transferred between a client and a server (on a current/first channel). At operation 325, the transmission rate on a second channel (or a bonded channel) is generated. The second channel may be bonded to the first channel, or to another channel. When "generated" is used, this may include sending test data (or actual data) on the second/bonded channel to determine a bandwidth (speed). This may also include obtaining bandwidth (speed) based on historical and/or published data and/or expected bandwidth. Processing may then proceed to operation 335, operation 355, and/or operation 375 (or another operation, not shown).

At operation 335, the transmission rate on the second/bonded channel is compared with a transmission rate threshold. If the transmission rate is greater than the threshold, and the data value associated with the second channel equals a data value threshold, then switching/bonding occurs. In one example, the data value threshold equals '0'. In another embodiment, the data value threshold is not '0', but a number that is relatively low (i.e., there is low extra value associated with the second channel, but the extra value is so low that the benefit of switching/bonding outweighs the disadvantage of the extra needed value). A bonding or switching process 345 may then be performed.

Alternatively, processing proceeds to operation 355. At operation 355, if the transmission rate on the second/bonded channel is greater than the first transmission rate threshold and less than the second transmission rate threshold, and if the data value associated with the second/bonded channel is greater than zero, than bonding/switching does not occur. In other words, the small marginal improvement obtained by bonding/switching does not justify the extra value (for example). As an example, assume that data is normally transmitted at 300 Mbps, the first transmit rate threshold is 300 Mbps, the second transmit rate threshold is 320 Mbps and the data value on the second channel is higher. In this situation, a minimal bandwidth increase to a number between 300 and 320 Mbps does not justify the extra value required. This decision may include no bonding or switching from one channel to another 365.

Alternatively, processing proceeds to operation 375. At operation 375, the transmission rate on the second/bonded channel is compared with the second transmit rate threshold. In one embodiment, if the transmission rate is greater than the threshold, then switching/bonding occurs (operation 385). Alternatively, and optionally, data value is also evaluated to determine whether it is greater/less than a data value threshold. In one example, bonding/switching occurs after evaluating the data value threshold. In another embodiment, if the data value threshold is extremely high and exceeds the current data rate, then bonding/switching does not occur. In another embodiment, the user is provided with a message indicating that the threshold has been exceeded and the data value is extremely high. The bonding/switching may be a decision based on other factors.

In a further exemplary embodiment of the present invention, a combination of FIG. 3A and FIG. 3B are implemented. Thus, bonding/switching occurs based on a combination of the operations set forth in FIG. 3A and the operations set forth in FIG. 3B. In a further embodiment, the thresholds in FIG. 3A and FIG. 3B can be adjusted so that the operations set forth in FIG. 3A are more likely to occur than the operations in FIG. 3B. Alternatively, the thresholds can be adjusted so that the operations in FIG. 3B are more likely to occur than the operations in FIG. 3A. A user interface can also be supplied that permits thresholds to be adjusted upward and downward for the operations in any of the example included in this specification to be more or less likely occur. Such a user interface can be a slide button on an interface that adjusts FIG. 3A thresholds and FIG. 3B thresholds inversely (i.e., thresholds in one figure are more readily crossed than thresholds in another figure).

In a further exemplary embodiment, an additional feature may be added in which, as the data value increases, the data rate threshold(s) also change. Thus, for example, as the value of the second channel increases, the benefit obtained by using the second channel must increase in order to justify the use of the second channel.

FIG. 4A and FIG. 4B are flowchart diagrams that illustrate operation of one or more exemplary embodiments of the present invention. FIGS. 4A and 4B relate to determinations that are made whether to mirror two channels (or switch from one channel to another channel). For example, if use of the second channel is a low value, such as '0', then mirroring is readily provided. If, however, use of the second channel requires additional resources then mirroring is deferred until mirroring justifies the value.

In FIG. 4A, at operation 410, data is transferred as a data stream between client 202 and server 160. Data is transferred as a data stream between client 202 and server 160 over a current (first) channel. At operation 420, error rate on the current channel is measured. Processing then proceeds to operation 430, operation 450, and/or operation 470 (or another operation).

At operation 430, if the error rate on the current channel is greater than an error rate threshold and a data value associated with a second channel is equal to a data value threshold, then processing proceeds to operation 440 where the current (first) channel is mirrored (or switched) with the second channel (operation 430). In one exemplary embodiment, the data value may be '0'. In another exemplary embodiment, the data value threshold in operation 430 is a low number but more than '0'. In other words, for example, if the value associated with the second channel is low, then benefits of mirroring may outweigh the extra value needed. However, if the extra value of mirroring are very high, the benefits may not be justified.

At operation 450, if error rate on the current channel is greater than a first error rate threshold and the error rate is less than a second error rate threshold, and if the data value is greater than a data value threshold, then processing proceeds to operation 460 and neither mirroring nor switching occurs. In this situation, while the error rate is higher than desired, the error rate is not high enough to justify the value of the second channel.

At operation 470, if the error rate on the current channel is greater than a second error rate threshold (and optionally if the data value associated with the second channel is greater than a data value threshold), then switching/mirroring occurs. In this example, switching/mirroring to/with a second channel occurs because the benefits outweigh the disadvantages (e.g., extra value required). In another example, before the switching/mirroring occurs, the user is provided a message explaining that switching/mirroring is recommended and requesting user authorization to switch/mirror. The user then responds to the message (when switching/mirroring is contemplated), and switching/mirroring occurs based on the results. The decision to bond or switch 480 may be automated as well when the criteria of operation 470 are fulfilled.

In FIG. 4A, the current channel is evaluated to determine whether the channel should be switched/mirrored. In FIG. 4B, by contrast, a second channel different from the current channel is evaluated to determine whether it should be switched to or used for mirroring.

In FIG. 4B, operation 410, data is transferred between a client and a server. Data is transferred on a current (first) channel.

At operation 425, the error rate on the second channel (or the first channel mirrored with the second channel) is generated. This error rate may be generated based on expectations, based on prior history, based on published information, based on the transmitting of test data (on the second or mirrored channel), or based on other information. After an error rate has been generated for the second/mirrored channels, processing proceeds to operation 435, operation 455, and/or operation 475, or based on another optional operation.

At operation 435, the error rate generated for the second/mirrored channel is compared with an error rate threshold. Also, a data value associated with the second/mirrored channel is compared with a data value threshold. If the error rate is less than an error rate threshold and a data value associated with the second channel is less than or equal to a data value threshold, then at operation 445 switching to or mirroring with the second channel occurs. For example, assume that the data value threshold is '0'. If there is no extra value needed to use the second channel, and the error rate is low (or lower than the current channel), then switching/mirroring occurs because the benefit (low or lower error rate) is not accompanied by the disadvantage of the extra value needed.

At operation 455, the error rate on the second channel is compared with a first error rate threshold and a second error rate threshold. If the error rate is between these two thresholds, and the data value associated with the second channel is greater than a data value threshold, then at operation 465 mirroring/switching to the second channel does not occur. In other words, because the error rate is between the first and second thresholds, while the error rate might be an improvement compared to the current error rate, because the data value is greater than the data value threshold, the benefit of switching/mirroring does not justify the consequences. As an example, assume the data value is higher than '0' on a per minute or per gigabyte basis. If the error rate obtained by switching/mirroring is only marginally desirable, the value of switching/mirroring may not be justifiable. On other hand, if the data value is '0' (or very low, such as a value of '10' out of '100'), switching/mirroring may be justifiable because the value is zero or extremely low. The value may represent the resources needed to maintain the channel, energy, third party impositions, data rate restrictions, time restrictions, etc.

At operation 475, if the error rate is lower than a second error rate threshold (and optionally if the data value associated with the second channel is greater than zero), then switching/mirroring occurs 485. In this situation, the error rate may be so low that its benefits are significantly better than the negatives. An error rate of zero may be beneficial regardless of the value needed. Thus mirroring/switching occurs at operation 485. As a further example, if the data value threshold is 10 cents, the mirroring/switching might be desirable, and the minimal value is not of concern. As an alternative, before proceeding to operation 485, the user can be prompted to approve proceeding to operation 485 via an interface. This may be desirable, for example, if the data value associated with the second channel indicates high value, such as a higher value than another available channel. However, the more likely result is that the action is automated based on the constraints outlined in this specification and the figures, such as operation 475 or other operations.

In a further exemplary embodiment of the present invention, a combination of FIG. 4A and FIG. 4B are implemented. Thus, mirroring/switching occurs based on a combination of the operations set forth in FIG. 4A and the operations set forth in FIG. 4B. In a further embodiment, the thresholds in FIG. 4A and FIG. 4B can be adjusted so that the operations set forth in FIG. 4A are more likely to occur than the operations in FIG. 4B. Alternatively, the thresholds can be adjusted so that the operations in FIG. 4B are more likely to occur than the operations in FIG. 4A. A user interface can also be supplied that permits thresholds to be adjusted upward and downward, so that the operations in one FIG. are more likely to be performed than the operations in another FIG. Such a user interface can be a slide that adjusts FIG. 4A thresholds and FIG. 4B thresholds inversely (i.e. thresholds in one figure are more readily crossed than thresholds in another figure).

In a further exemplary embodiment, an additional feature may be added in which, as the data value increases, the error rate threshold(s) also change. Thus, for example, as the value of the second channel increases, the benefit obtained by using the second channel must increase in order to justify the use of the second channel.

Figure 5:
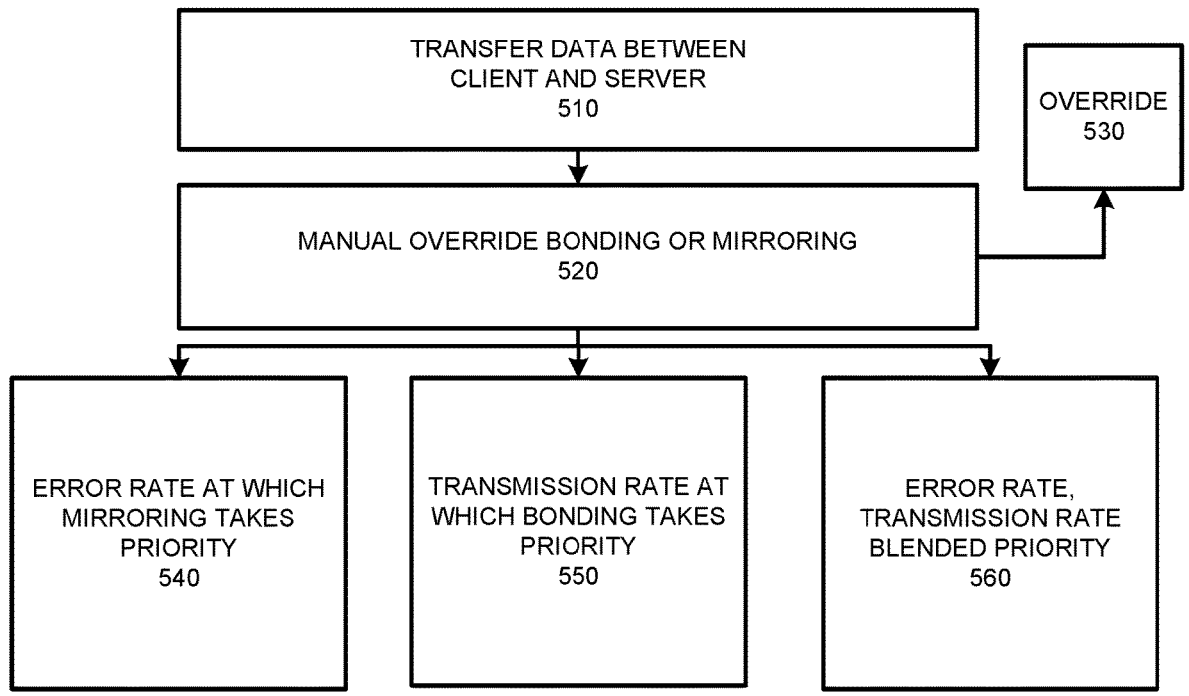
FIG. 5 is a flowchart diagram that illustrates operation of one or more exemplary embodiments of the present invention.

FIG. 5 is a flowchart diagram that illustrates operation of a further exemplary embodiment of the present invention. In particular, while FIGS. 3A and 3B relate to channel bonding in order to increase transmission rate, and FIGS. 4A and 4B relate to channel mirroring in order to decrease error rate, FIG. 5 illustrates a situation of whether channels should be bonded based on all the examples.

At operation 510, data is transferred between a client and a server. At operation 520, a determination is made as to whether a user has made a manual override of bonding or mirroring. Thus, for example, the user may specify that bonding should occur and mirroring should not occur under certain criteria which can automate the process, or that mirroring should occur and bonding should not occur, which may also be an automated decision based on certain criteria. Based on this manual override, at operation 530, bonding to the exclusion of mirroring, or mirroring to the exclusion of bonding, is permitted. Alternatively, the operations included in FIG. 3A and/or FIG. 3B may be performed while the operations included in FIG. 4A and/or FIG. 4B are not, or vice versa. At operation 540, an error rate may be selected (in a current or possibly available channel) at which mirroring takes priority over bonding. At operation 550, a transmission rate (in a current or possibly available channel) at which bonding takes priority over mirroring can be selected. At operation 560, the error rate and transmission rate are both evaluated to determine which of bonding or mirroring takes priority.

In yet a further exemplary embodiment of the present invention, a user may disable either bonding or mirroring so that the other of the two is available. In one such situation, either a data stream is transferred on a single channel or a data stream is transferred on bonded channels and mirroring does not occur. In yet another example, based on user selection, a data stream is transferred on a single channel or data stream is transferred on a mirrored channel, and bonding does not occur.

Figure 6:
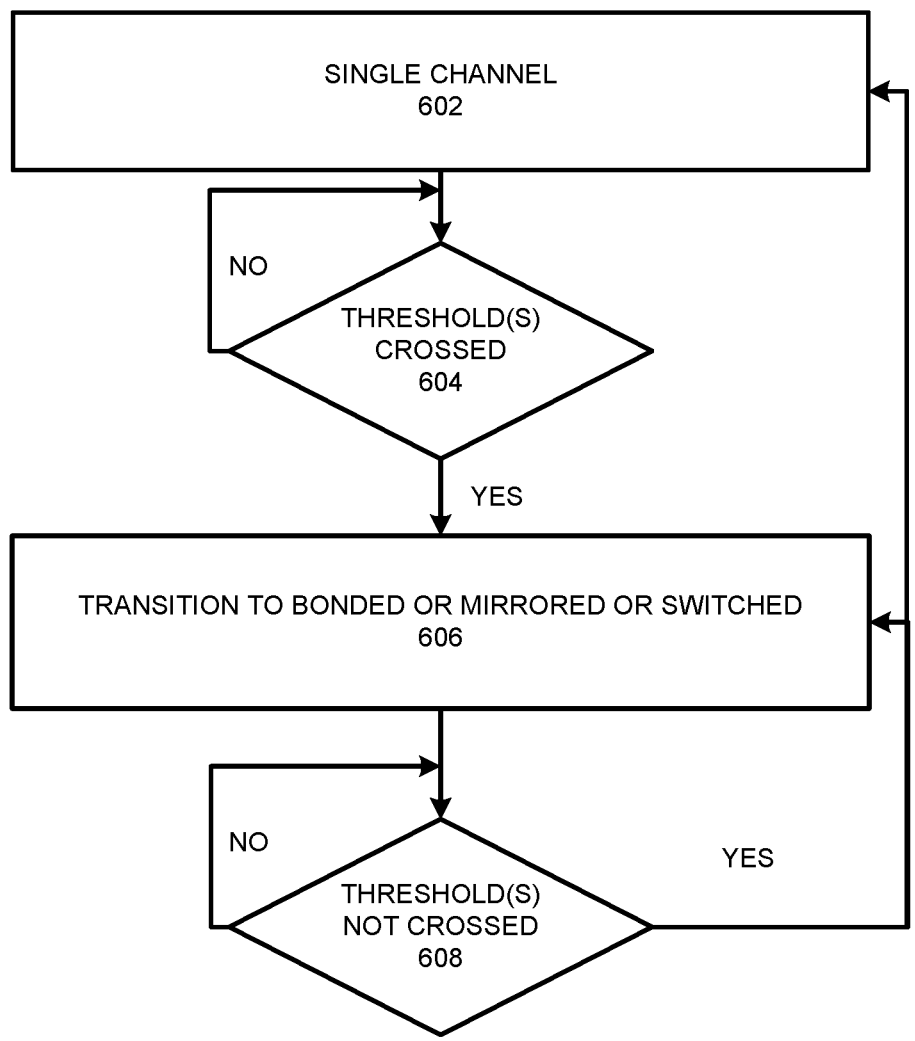
FIG. 6 is a flowchart diagram that illustrates operation of one or more exemplary embodiments of the present invention.

FIG. 6 is a flowchart diagram that illustrates yet another exemplary embodiment of the present invention. At operation 602, data is transferred on a single channel. At operation 604, a determination is made as to whether one or more thresholds have been crossed. If thresholds have not been crossed, then processing loops through operation 604. Otherwise, processing proceeds to operation 606 where transfer of the data stream transitions to bonded or mirrored channels. Subsequently, the channels that are being used for transfer of the data stream are evaluated to determine whether any measured parameters have crossed a threshold. If measured parameters are not in violation of a maximum or minimum threshold, then monitoring continues to loop through operation 608. If, however, data values are across one or more thresholds, then processing proceeds to operation 602 to reinstate the process and bonding or mirroring may be terminated and transfer of the data stream on a single channel resumes. Or, the transition is performed under certain circumstances as operation 606 is performed.

The above examples have included switching from non-bonded channels to bonded channels, and switching from non-mirrored channels to mirrored channels. It is also possible to switch from bonded channels to non-bonded channels depending upon whether or not thresholds are crossed. It is also possible to switch from mirrored channels to non-mirrored channels depending upon whether or not thresholds are crossed. It is also possible to switch between bonded channels and mirrored channels depending upon whether or not thresholds are crossed.

The above explanation has included examples in which various operations are taken to improve streaming to a client such as mobile device. It is understood, however, that the above examples may relate to the streaming of data to other devices such as to a server.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

Figure 7:
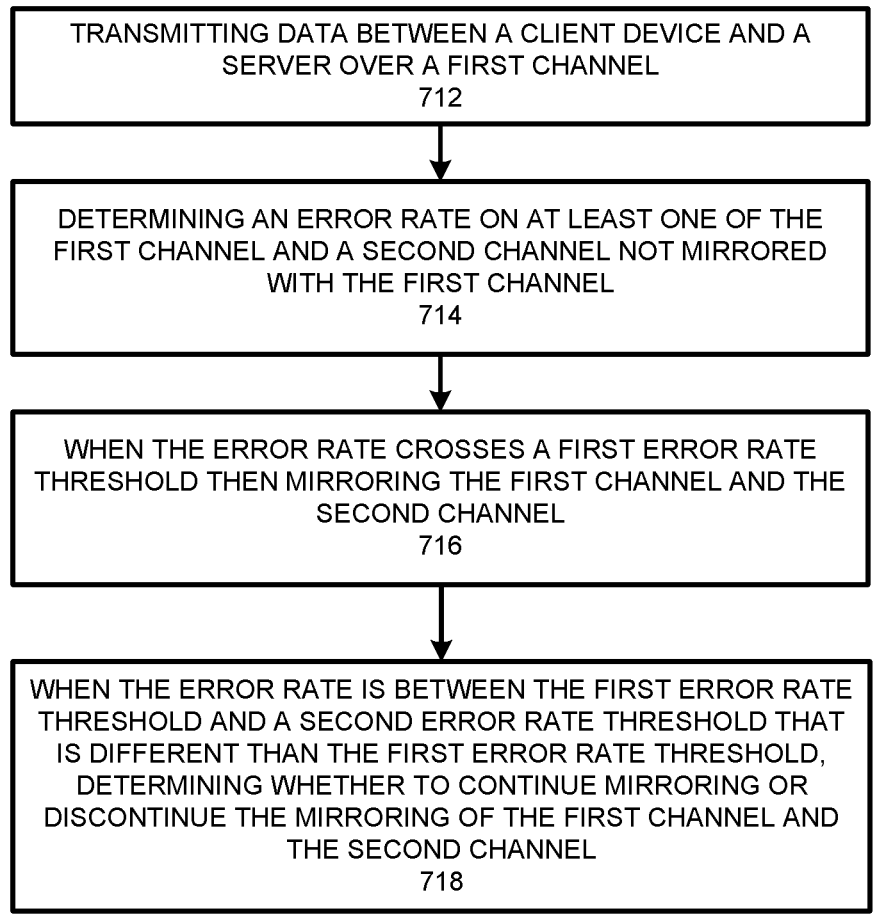
FIG. 7 is a flowchart diagram that illustrates operation of one or more exemplary embodiments of the present invention.

FIG. 7 illustrates an example process according to example embodiments. Referring to FIG. 7, the process 700 may include transmitting data between a client device and a server over a first channel 712, determining an error rate on at least one of the first channel and a second channel not mirrored with the first channel 714, when the error rate crosses a first error rate threshold then mirroring the first channel and the second channel 716, and when the error rate is between the first error rate threshold and a second error rate threshold that is different than the first error rate threshold, determining whether to continue mirroring or discontinue the mirroring of the first channel and the second channel 718.

In one example, when the error rate crosses the second error rate threshold and is not between the first error rate threshold and the second error rate threshold then mirroring the first channel and said second channel. The process may also include determining a latency associated with the first channel and a latency associated with the second channel, and continuing to mirror the first channel and the second channel when the latency is above a latency threshold on at least one of the first channel and the second channel. The latency threshold may be a certain number of milliseconds (e.g., 10 ms, 50 ms, 100 ms, etc.)

The process may also include determining a latency associated with the first channel and a latency associated with the second channel, and discontinuing to mirror the first channel and the second channel when the latency is below a latency threshold on at least one of the first channel and the second channel. The process may further include determining a data value of the first channel and a data value of the second channel, wherein the data values are based on an amount of energy consumed by the channels, and an availability of data associated with the channels. After a predetermined period of time, bonding the first channel and the second channel may occur when the data value of the first channel and the data value of the second channel does not exceed a data value threshold. The data value threshold is a total amount of available data over a period of time subject to restrictions and other limitations.

Latency (time in ms) and error rate (errors per unit time) are measured for decisions on whether to bond and/or mirror two or more channels together, the latency and error rate according to one example embodiment are not fixed rates and are instead dynamic for purposes of determining whether to mirror or bond two or more channels. In one example, the error rate may be below an error rate threshold, however, the higher the latency time is at any particular time, the more sensitive the error rate becomes. In other words, an error rate of 'X' errors per second may be acceptable for a single channel transmission while the latency is below a certain rate, however, as the latency rises, the same error rate of 'X' errors per second may no longer be acceptable and the decision to bond or mirror channels may become inevitable to reduce errors and latency. Additionally, a fixed latency rate over a period of time may be acceptable for data transmissions while an increasing error rate may cause channel mirroring or bonding to occur alone without the latency being a consideration. Those various different considerations may be a weighted function of error rate and latency over a period of time. One data network characteristic can be weighted higher than one or more others for purposes of determining whether to bond or mirror channels. For example, the latency could be multiplied by a factor of two or more and added to the error rate and the output of this weighted function could be used to make the decision to bond and/or mirror channels.

Note the availability of data may be a way to assess the value, if the data channel is cellular and the availability of data is limited over a period of time, the value is higher on particular channel if the availability of data is not limited. Latency can be include as an additional consideration, lost packets and latency are included together in certain examples. In one example, detecting lost packets may yield an error rate over time, messages returned, packets not received are also considerations for error rate. Latency is a time measurement, if the error rate is not good, and/or the latency is not good then the decision making provides as to whether to mirror or bond, or switch channels or do nothing. The data rate can be a valid measurement taken to be within a threshold range or something used as an additional consideration to consider when deciding whether to start, stop or continue mirroring.

In one example, if the data rate crosses a first threshold and a data value associated with said second channel is less than or equal to a data value threshold, then bonding the first channel and the second channel may be performed. If the data rate is between the first threshold and a second threshold, and the data value is greater than the data value threshold, then bonding the first channel and the second channel may be not necessary. If the data rate crosses the second threshold and is not between the first threshold and the second threshold then bonding the first channel and said second channel may be necessary.

One operation may include transmitting data between a client and a server by transitioning from the mirrored connection to the bonded connection if, after transitioning from the bonded connection to the mirrored connection, the error rate does not drop by more than an error rate drop threshold. Another operation may include transmitting data between a client and a server by transitioning from the mirrored connection to the first channel without the mirrored connection if, after transitioning to the mirrored connection, the error rate does not decrease and cross an error rate threshold.

Another operation may include transmitting data between a client and a server. The process may include transmitting data from and receiving data at a VPN client within the client over a first channel that is unbonded, measuring data rate over the first channel, determining that a second connection is available to be bonded with said first connection, evaluating a data rate on the first connection to determine whether data rate on the first connection is below a first threshold, and if the data rate on the first connection drops so that it is below the first threshold, and the second connection has a value less than or equal to 'X', then bonding the first connection with the second connection, and if the second connection has a cost above 'X', then maintaining the first connection as unbonded so that it is not bonded with the second connection, and evaluating a data rate on the first channel to determine whether the data rate on the first channel is below a second threshold lower than the first threshold, and if the data rate on the first channel drops so that it is below the second threshold, then bonding the first channel with the second channel.

In an exemplary embodiment of the present invention a computer system may be included and/or operated within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system includes a processing device, a main memory (e.g., read-only memory (ROM), flash memory, dynamic random access memory (DRAM) (such as synchronous DRAM (SDRAM) or Rambus DRAM (RDRAM), etc.), a static memory (e.g., flash memory, static random access memory (SRAM), etc.), and a data storage device, which communicate with each other via a bus.

Processing device represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device is configured to execute listings manager logic for performing the operations and operations discussed herein.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

Data storage device may include a machine-readable storage medium (or more specifically a computer-readable storage medium) having one or more sets of instructions embodying any one or more of the methodologies of functions described herein. Data storage may also reside, completely or at least partially, within main memory and/or within processing device during execution thereof by computer system; main memory and processing device also constituting machine-readable storage media.

Virtual private network (VPN) device/server may indicate any similar system that encapsulates packets to transmit them to and from a client device and to and from a remote server. For example, a VPN may be a software defined network (SDN) or SD wide area network (SD-WAN), or a multi-path TCP (MPTCP) proxy device.

Machine-readable storage medium may also be used to store the device queue manager logic persistently. While a non-transitory machine-readable storage medium is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the aforementioned description, numerous details are set forth. It will be apparent, however, to one skilled in the art, that the disclosure may be practiced without these specific details. In some instances, well-known structures and devices are shown in block diagram form, rather than in detail, in order to avoid obscuring the disclosure.

The above explanation has included multiple examples and multiple embodiments. It is understood to one of ordinary skill of the art that more than one of these examples and more than one of these embodiments can be combined in order to create further examples and embodiments. Also, disclosed features can be eliminated from various embodiments as desired. Also, some features of one embodiment may be combined with some features of another embodiment.

Computer system may further include a network interface device. Computer system also may include a video display unit (e.g., a liquid crystal display (LCD) or a cathode ray tube (CRT)), an alphanumeric input device (e.g., a keyboard), a cursor control device (e.g., a mouse), and a signal generation device (e.g., a speaker).

A data storage device may include a machine-readable storage medium (or more specifically a computer-readable storage medium) having one or more sets of instructions embodying any one or more of the methodologies of functions described herein. The data storage may also reside, completely or at least partially, within main memory and/or within processing device during execution thereof by computer system; main memory and processing device also constituting machine-readable storage media.

Machine-readable storage medium may also be used to store the device queue manager logic persistently. While a non-transitory machine-readable storage medium is illustrated in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

Figure 8:
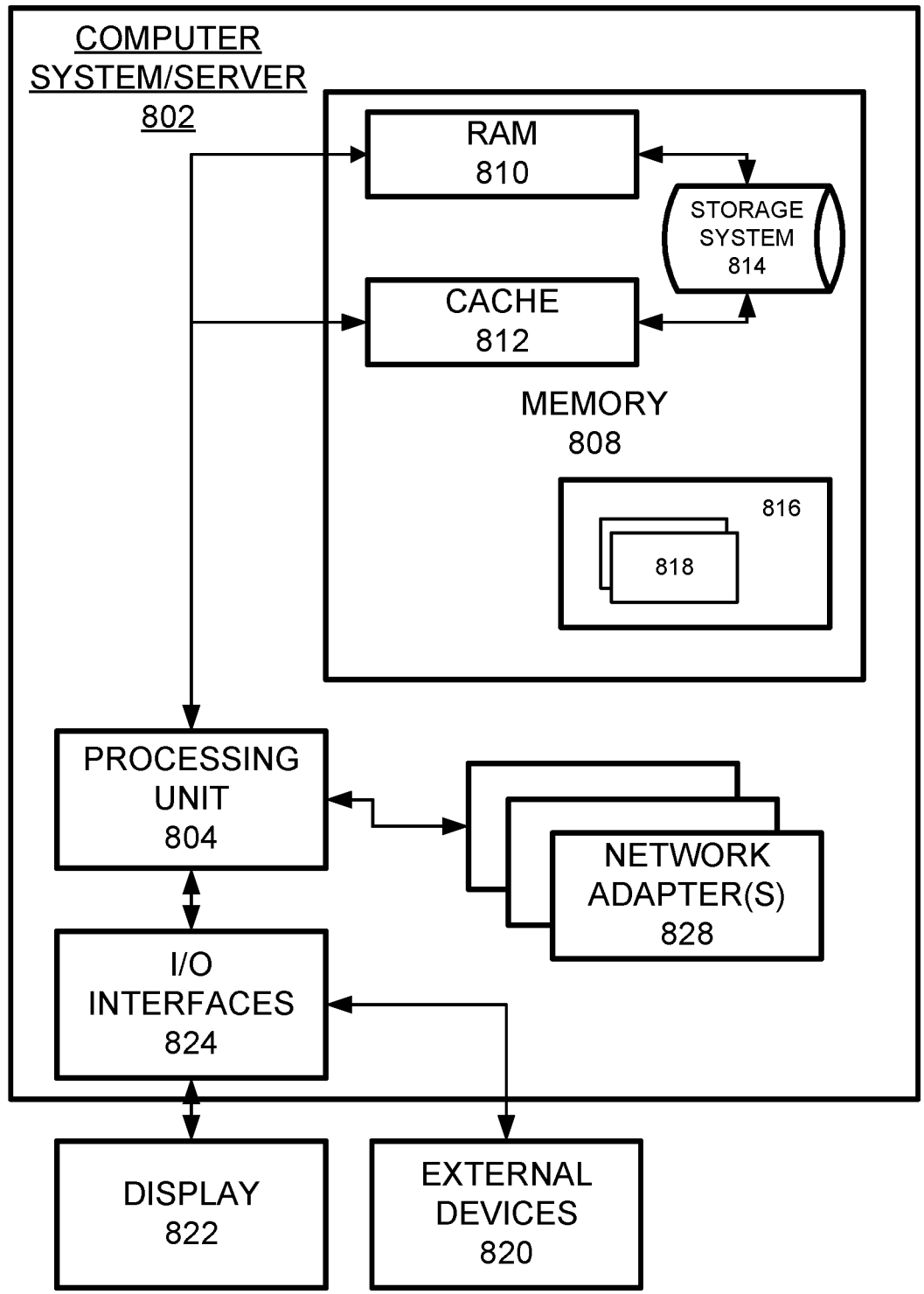
FIG. 8 is an example configuration used to store and execute instructions according to one or more exemplary embodiments of the present invention.

FIG. 8 is a computer readable medium and corresponding system configuration of an example device(s) configured to perform one or more operations associated with exemplary embodiments of the present invention.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

FIG. 8 illustrates an example network entity device configured to store instructions, software, and corresponding hardware for executing the same according to example embodiments. FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 8, computer system/server 802 in cloud computing node 800 is displayed in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter(s) 826. As depicted, network adapter(s) 826 communicates with the other components of computer system/server 802 via a bus. It should be understood that although not displayed, other hardware and/or software components could be used in conjunction with computer system/server 802. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with operations in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

The invention claimed is:
1. A method comprising:
transmitting data between a client device and a server over a first channel and a second channel;

determining a transmission rate of the second channel by measuring a speed of data transmitted on the second channel;
determining the transmission rate of the second channel is above a transmission rate threshold associated with the first channel;
determining an expected bandwidth increase for a combined transmission rate of both channels for the first channel being bonded with the second channel, wherein the expected bandwidth increase is determined based on a comparison of a transmission rate of the first channel and the transmission rate of the second channel; and
bonding the first channel with the second channel when it is determined that the transmission rate of the second channel is above the transmission rate threshold and when a data value assigned as a cost to use the second channel is less than or equal to a data value threshold.

2. The method of claim 1, comprising:
determining whether the transmission rate of the second channel is higher than the transmission rate of the first channel; and
determining to use the second channel when the transmission rate of the second channel is higher than the transmission rate of the first channel.

3. The method of claim 1, wherein the transmission rate threshold is based on the transmission rate of the first channel.

4. The method of claim 1, comprising:
sending test data between the client device and the server on the second channel to identify the transmission rate of the second channel.

5. The method of claim 4, comprising:
determining a latency associated with the first channel and a latency associated with the second channel.

6. The method of claim 1, comprising:
determining a data value of the first channel and a data value of the second channel, wherein the data values are based on an availability of data associated with the channels, wherein when the data value of the second channel equals a data value threshold and the transmission rate is greater than the transmission rate threshold then performing the bonding.

7. The method of claim 1, wherein when the transmission rate of the first channel is greater than the transmission rate threshold but less than another transmission rate threshold, then determining not to perform the bonding of the first channel with the second channel.

8. A server comprising:
a receiver configured to receive transmitted data from a client device over a first channel and a second channel;
a processor configured to
determine a transmission rate of the second channel by measuring a speed of data transmitted on the second channel;
determine the transmission rate of the second channel is above a transmission rate threshold associated with the first channel;
determine an expected bandwidth increase for a combined transmission rate of both channels for the first channel being bonded with the second channel, wherein the expected bandwidth increase is determined based on a comparison of a transmission rate of the first channel and the transmission rate of the second channel; and
bond the first channel with the second channel when it is determined that the transmission rate of the second channel is above the transmission rate threshold and when a data value assigned as a cost to use the second channel is less than or equal to a data value threshold.

9. The server of claim 8, wherein the processor is further configured to:
determine whether the transmission rate of the second channel is higher than the transmission rate of the first channel; and
determine to use the second channel when the transmission rate of the second channel is higher than the transmission rate of the first channel.

10. The server of claim 8, wherein the transmission rate threshold is based on the transmission rate of the first channel.

11. The server of claim 8, wherein the processor is further configured to:
send test data between the client device and the server on the second channel to identify the transmission rate of the second channel.

12. The server of claim 11, wherein the processor is further configured to:
determine a latency associated with the first channel and a latency associated with the second channel.

13. The server of claim 8, wherein the processor is further configured to:
determine a data value of the first channel and a data value of the second channel, wherein the data values are based on an availability of data associated with the channels, wherein when the data value of the second channel equals a data value threshold and the transmission rate is greater than the transmission rate threshold then performing the bonding.

14. The server of claim 8, wherein when the transmission rate of the first channel is greater than the transmission rate threshold but less than another transmission rate threshold, then the processor determines not to perform the bonding of the first channel with the second channel.

15. A non-transitory computer readable storage medium configured to store instructions that when executed cause a processor to perform:
transmitting data between a client device and a server over a first channel and a second channel;
determining a transmission rate of the second channel by measuring a speed of data transmitted on the second channel;
determining the transmission rate of the second channel is above a transmission rate threshold associated with the first channel;
determining an expected bandwidth increase for a combined transmission rate of both channels for the first channel being bonded with the second channel, wherein the expected bandwidth increase is determined based on a comparison of a transmission rate of the first channel and the transmission rate of the second channel; and
bonding the first channel with the second channel when it is determined that the transmission rate of the second channel is above the transmission rate threshold and when a data value assigned as a cost to use the second channel is less than or equal to a data value threshold.

16. The non-transitory computer readable storage medium of claim 15, wherein the processor is further configured to perform:
determining whether the transmission rate of the second channel is higher than the transmission rate of the first channel; and determining to use the second channel when the transmission rate of the second channel is higher than the transmission rate of the first channel.

17. The non-transitory computer readable storage medium of claim 15, wherein the transmission rate threshold is based on the transmission rate of the first channel.

18. The non-transitory computer readable storage medium of claim 15, wherein the processor is further configured to perform:

sending test data between the client device and the server on the second channel to identify the transmission rate of the second channel.

19. The non-transitory computer readable storage medium of claim 18, wherein the processor is further configured to perform:

determining a latency associated with the first channel and a latency associated with the second channel.

20. The non-transitory computer readable storage medium of claim 15, wherein the processor is further configured to perform:

determining a data value of the first channel and a data value of the second channel, wherein the data values are based on an availability of data associated with the channels, wherein when the data value of the second channel equals a data value threshold and the transmission rate is greater than the transmission rate threshold then performing the bonding.

* * * * *